United States Patent [19]

Wood et al.

[11] Patent Number: 5,555,144
[45] Date of Patent: Sep. 10, 1996

[54] BALANCING SYSTEM FOR A DISC DRIVE DISC ASSEMBLY

[75] Inventors: Roy L. Wood, Yukon; John D. Stricklin, Oklahoma City; Loren D. Skarky, Bethany, all of Okla.

[73] Assignee: Seagate Technology, Inc., Scotts Valley, Calif.

[21] Appl. No.: 371,843

[22] Filed: Jan. 12, 1995

[51] Int. Cl.$^6$ .............................. G11B 17/02; F16F 15/22
[52] U.S. Cl. .................................. 360/98.08; 360/98.07; 360/99.08; 74/573 R
[58] Field of Search ............................. 360/97.01–97.03, 360/98.01, 98.07, 98.08, 99.04, 99.05, 99.08–99.12; 74/573 R, 574; 29/598, 737, 901, DIG. 28

[56] References Cited

U.S. PATENT DOCUMENTS

| | | | |
|---|---|---|---|
| 3,854,347 | 12/1974 | Hellerich | 360/137 |
| 4,683,505 | 7/1987 | Schmidt et al. | 360/97.03 |
| 4,784,012 | 11/1988 | Marra | 74/573 R |
| 4,916,866 | 4/1990 | Bernard et al. | 451/220 |
| 4,951,526 | 8/1990 | Linder | 74/573 R |
| 5,074,723 | 12/1991 | Massa et al. | 409/131 |
| 5,130,870 | 7/1992 | Jabbari | 360/99.08 |
| 5,167,167 | 12/1992 | Tiernan, Jr. et al. | 74/574 |
| 5,249,090 | 9/1993 | Fehse | 360/98.08 |
| 5,422,776 | 6/1995 | Thorson et al. | 360/98.07 |
| 5,460,017 | 10/1995 | Taylor | 74/574 |

*Primary Examiner*—Jefferson Evans
*Attorney, Agent, or Firm*—Bill D. McCarthy; Edward P. Heller, III; Louis W. Watson

[57] ABSTRACT

A disc assembly for a disc drive has a balancing clip mounted on a shoulder formed on other portions of the assembly to balance the disc assembly. The disc assembly includes a cylindrical hub on which data storage discs, interspersed with ring shaped spacers, are mounted and the discs and rings are clamped into place on the hub between a flange formed on one end of the hub and a clamp ring that is secured about the other end of the hub by heat shrinking the clamp ring onto the hub. A circular shoulder is formed coaxially with the hub on a face that is, in turn, formed perpendicularly to the hub axis on either the clamp ring or the end of the hub adjacent the clamp ring. The balancing clip is a C-shaped lamella having a circularly arcuate inner periphery for mating with the shoulder. The outer periphery of the balancing clip is elliptically arcuate and is bilaterally symmetric with respect to the major axis of the ellipse to which the outer edge conforms. The shoulder is undercut to conform to a conical surface opening away from the face on which the shoulder is formed and portions of the inner periphery of the balancing clip are chamfered to conform to conical surfaces opening toward the sides of balancing clip at the cone angle of the shoulder.

5 Claims, 4 Drawing Sheets

5,555,144

BALANCING SYSTEM FOR A DISC DRIVE DISC ASSEMBLY

BACKGROUND OF THE INVENTION

1. Field of the Invention

The present invention relates generally to improvements in apparatus for balancing rotating objects, and, more particularly, to improvements in the balancing of disc drive disc assemblies.

2. Brief Description of the Prior Art

In a disc drive, computer files are stored along concentric data tracks that are defined in magnetizable surface coatings of rotatable discs. More particularly, files are saved as sequences of data track segments, or sectors, that are each magnetized in a pattern that reflects the contents of a portion of the file and the file can subsequently be retrieved by sensing the magnetic field that these segments generate adjacent the disc surfaces.

To implement this mode of storage and retrieval, the discs are rotated during operation of the disc drive and read/write heads that "fly" over the disc surfaces are aligned with selected data tracks to write the file as the magnetic medium passes the head, via currents passed through the head, or to read the file via emfs induced in the head by passage of so-called flux transitions along the data track. The heads are mounted on an actuator that is positioned by a servo system, operating from signals induced in at least one of the heads, that generates actuator correction signals from servo patterns that were written to one or more disc surfaces at the time the disc drive was manufactured. By using such a servo system to position the actuator and, consequently, the heads, the data tracks dan be very closely spaced to result in a large data storage capacity for the disc drive.

However, as will be clear to those of skill in the art, the more closely the data tracks are spaced, the more difficult it becomes to follow a selected data track at which a file is to be stored or to which a file has been previously stored. More particularly, mechanical vibration of the disc drive can, if sufficiently severe, interfere with track following by the read/write heads for track spacings that can be readily achieved using current head technology. As a result, unless vibration is controlled, track densities and, consequently, data storage capacities are artificially limited. Further, vibration gives rise to noise that is unwelcome in the environments in which computers are used.

A source of vibration that is inherent to the disc drive is vibration arising from the rotation of the discs on which files are stored. The discs have the general form of circular platters, having central, circular apertures, and they are mounted on the case of a disc drive by clamping them to a cylindrical hub which passes through the apertures and is itself mounted on the disc drive case for rotation about the cylinder axis of the hub. The discs are separated by spacers, which have a toroidal form to fit over the hub between the discs and the entire disc assembly, including the discs, the hub, and the spacers, is clamped together by a clamp ring that is mounted on one end of the hub to bear against one end of the disc stack, the other end of which is supported by a circular flange on the end of the hub.

As will be clear from the above description of the disc assembly, the disc assembly is, at least in principle, cylindrically symmetrical with respect to the rotation axis of the assembly; i.e., the axis of the hub. Consequently, and again in principle, the center of mass of the assembly will be located on the rotation axis and the assembly will be statically balanced for rotation on the disc drive case. In practice, a number of factors give rise to an imbalance of the disc assembly. For example, small variations occur in disc thickness with location on the disc surface; the discs are not perfectly circular; and the central mounting apertures are not perfectly concentric with the outer edges of the discs. Similarly, the hub itself will generally not be perfectly balanced nor, in general, will the discs be perfectly positioned on the hub.

While, these factors are each small and, indeed, while steps are taken in the manufacture of a disc drive to minimize the effects of these factors, they nevertheless add up to cause an imbalance of the disc assembly that is sufficient, unless compensated, to cause vibration of the disc drive that will interfere with track following and cause noise problems at the track densities and rotation speeds that are presently in use and the even higher densities and speeds contemplated for the future. Accordingly, it has become standard practice to balance the disc assembly at the time of manufacture of the assembly.

However, conventional methods for balancing the disc assembly present problems in their own right. Thus, for example, one approach to balancing a disc assembly that has been used in the past is to place pieces of adhesive backed lead foil in strategic locations on the assembly. One problem with this approach is that the foil may come loose after the disc drive has been in operation over an extended period of time because of aging of the adhesive. A second problem is that the adhesive forms a source of large organic molecules which can adhere to, and build up on, the heads to interfere with the "flying" of the heads above the disc surface. With smaller flying heights that are expected in future disc drives, this latter problem is by no means inconsequential.

A second approach that has been used in the past is to drill a series of symmetrically spaced holes in one end of the hub, tap them and use set screws of various lengths mounted in the holes to effect the final balance. This approach suffers from several disadvantages. Because of the number of parts involved, both the amount of machining required to implement the approach and the time required for the subsequent installation of the screws undesirably increases the cost of the disc drive. Moreover, the tapped holes can trap particulate matter that can later be dislodged and adhere to a disc surface to interfere with the flight of heads adjacent the surface. As is well known in the art, the heights at which heads fly over disc surfaces are measured in microinches so that even a very small particle on a disc surface acts as a large obstacle to a head. Consequently, the particle represents a surface flaw that prevents portions of the surface from being used for the storage of data.

As a result, while it is known to balance the disc assemblies of disc drives and while a variety of techniques have been developed for this purpose, the prior art balancing techniques leave much to be desired. Moreover, as rotation speeds increase, head flying heights decrease and track densities increase, it can be expected that the prior art disc assembly balancing techniques will become even less suited to the basic purpose for which they were developed.

SUMMARY OF THE INVENTION

The present invention provides a balancing system for the disc assembly of a disc drive that can be readily implemented with inexpensive machining and easily installed when a disc drive is manufactured. In the preferred embodiment of the invention, a circular shoulder, coaxial with the hub that supports the discs, is formed on a face of a component of the disc assembly that is perpendicular to the hub axis and the disc assembly includes a lameliar, C-shaped balancing clip, having a circular inner periphery that is slightly smaller than the shoulder, that is mounted on the shoulder to mate with and grip the shoulder for any orientation of the balancing clip about the hub axis. Preferably, the shoulder is formed on the clamp ring that is used to secure the discs to the hub but the invention also contemplates that the shoulder can be formed on the hub itself.

The clip is constructed in a selection of configurations, which differ one from another only in that the gap between the ends of the C varies from one configuration to the next. Thus, the center of mass of the clip will be displaced from the center of the inner periphery of the clip by an amount that depends upon the specific configuration of the clip. This configuration is easily controlled during manufacture by stamping the balancing clip from sheet metal using a selection of dies. Further, since both the shoulder on the clamp ring or hub and the inner periphery of the balancing clip are circular, the balancing clip can be rotationally oriented in any manner on remaining portions of the disc assembly. Consequently, by selecting a balancing clip having an appropriately located center of mass and selecting an appropriate orientation for the clip on the shoulder, balancing of any disc assembly, to any desired degree, can be quickly effected by spreading the selected clip, placing it on the shoulder at the selected orientation, and releasing it.

Other aspects of the invention are directed toward novel features of the balancing clip and shaping of the shoulder and clip inner periphery. In particular, in one additional aspect of the invention, the shoulder is undercut to form a conical surface opening away from the face on which the shoulder is formed and portions of the inner periphery of the clip adjacent one or both sides of the clip are chamfered to similarly conform to the surface of a cone, having the same cone angle as the shoulder, that opens toward the sides of the clip to which the portions are adjacent. Such shaping will result in forces on the balancing clip that will force the clip tightly against the face on which the shoulder is formed to prevent warping of the clip that might interfere with the balance of the disc assembly or result in a projection of the clip from the face. The latter point is not inconsequential; the axial length of the disc assembly in a disc drive is an important consideration in disc drive design. The more closely this length, and the axial thicknesses of components of the disc assembly, can be controlled, the more discs that can be included in the disc drive.

A second additional aspect of the invention is the manner in which the outer periphery of the balancing clip is shaped. More particularly, the outer periphery of the clip is shaped to conform to a portion of an ellipse that is centered on the center of the inner periphery and, further, is bilaterally symmetric about the major axis of the ellipse. As a result, the displacement of the center of mass from the center of the inner periphery can be maximized for a small thickness for the clip that is consistent with the axial length requirements for the disc assembly that have been noted above.

Moreover, the elliptical shape of the outer periphery of the balancing clip serves a second useful purpose. As noted above, the sides of the clip are spread for placement on the shoulder and such spreading, coupled with the small thickness of the clip, can result in stresses in the clip that can cause inelastic deformation of portions of the clip opposite the gap between the end of the C. The elliptical shape of the outer periphery of the clip permits larger spreading of the clip before such deformation will occur. The larger spreading capability, in turn, facilitates machine emplacement of the clip on remaining portions of the disc assembly in the manner that will be described below.

An important object of the present invention is to provide a balancing system for the disc assembly of a disc drive that is readily manufactured and emplaced.

Another object of the invention is to eliminate disadvantages in disc assembly balancing systems that have been employed in the past.

Yet another object of the present invention is to provide a disc assembly balancing system that is inexpensive to manufacture.

Still a further object of the invention is to provide an effective disc assembly balancing system that employs a minimum number of parts.

Other objects, features and advantages of the present invention will become apparent from the following detailed description when read in conjunction with the drawings and appended claims.

DESCRIPTION OF THE PREFERRED EMBODIMENT

Figure 1:
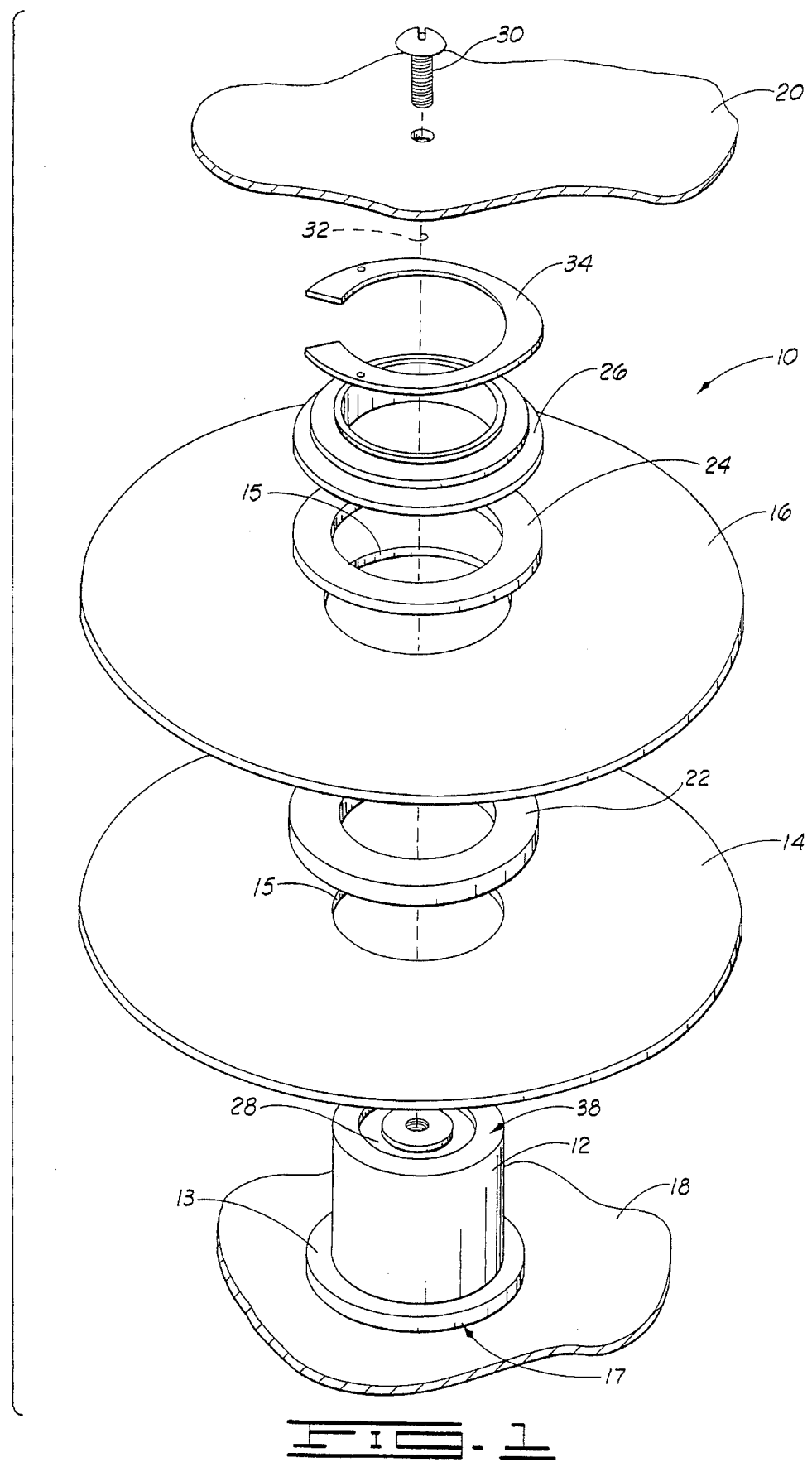
FIG. 1 is an exploded isometric view of a disc drive disc assembly constructed in accordance with the present invention.

Referring now to the drawings in general and to FIG. 1 in particular, shown therein and designated by the general reference numeral 10 is a disc drive disc assembly employing the balancing system of the present invention. As shown in FIG. 1, the disc assembly 10 is comprised of a conventional, cylindrical hub 12 that supports a plurality of conventional data storage discs 14 and 16 on the case, represented by fragments of bulkheads 18 and 20, of a disc drive. (For clarity of illustration, only two data storage discs have been shown in FIG. 1. As will be clear to those of skill in the art, substantially any number of discs may be included in a disc drive wherein the present invention is employed.) More particularly, the hub 12 has a flange 13 formed on one end 17 thereof and the discs are provided with central apertures 15 that will slip over major portions of the outside surface of the hub to be supported by the flange 13 when the disc assembly 10 is assembled.

As is also conventional, each pair of discs is separated by a toroidal spacer 22 and the uppermost disc can be surmounted by a washer 24, the spacers and the washer forming part of a clamping assembly (not numerically designated in the drawings) that is used to secure the discs to the hub 12 in a manner that will be discussed below. The clamping assembly is further comprised of a clamp ring 26 that, for the preferred embodiment of the present invention, has a construction that has been further illustrated in FIGS. 2 and 3.

In the disc assembly that has been illustrated, the hub 12 is the rotor of a dc electric motor, and as is conventional, is supported for rotation on the case of the disc drive by internal bearings that are mounted on the stator 28 of the motor. In such case, the stator 28 can be secured between the bulkheads 18 and 22 in any convenient manner; for example, with screws that pass through the bulkheads as illustrated by the screw 30 in FIG. 1. It will also be clear that the mounting of the hub 12, and its relationship to a motor that enables it to be rotated during the operation of a disc drive, that has been shown in FIG. 1 is for purposes of providing a concrete example that will facilitate an understanding of the invention but is not limiting on the practice of the invention.

As is often the case and as is contemplated by the present invention, the hub 12, the discs 14 and 16, the spacer 22 and the washer 24 share a characteristic that is also carried into the disc clamp 26; that is, cylindrical symmetry about a central axis that, ideally, is the axis of rotation 32 of the disc assembly 10 during operation of the disc drive. Thus, ideally, the center of mass of the portions of the disc assembly 10 so far described will lie on the axis of rotation of the disc assembly 10 so that the disc assembly 10 will be balanced for rotation during operation of the disc drive of which it is a part. In practice, such will generally not be true and the present invention provides a system for balancing the disc assembly 10 that, in the preferred embodiment shown in FIGS. 1 through 6, is implemented through the construction of the clamp ring 26 and the inclusion in the disc assembly 10 of a balancing clip 34, more fully illustrated in FIGS. 4 and 5, that coacts with the clamp ring 26 in a manner that has been particularly illustrated in FIG. 6.

Figure 2:
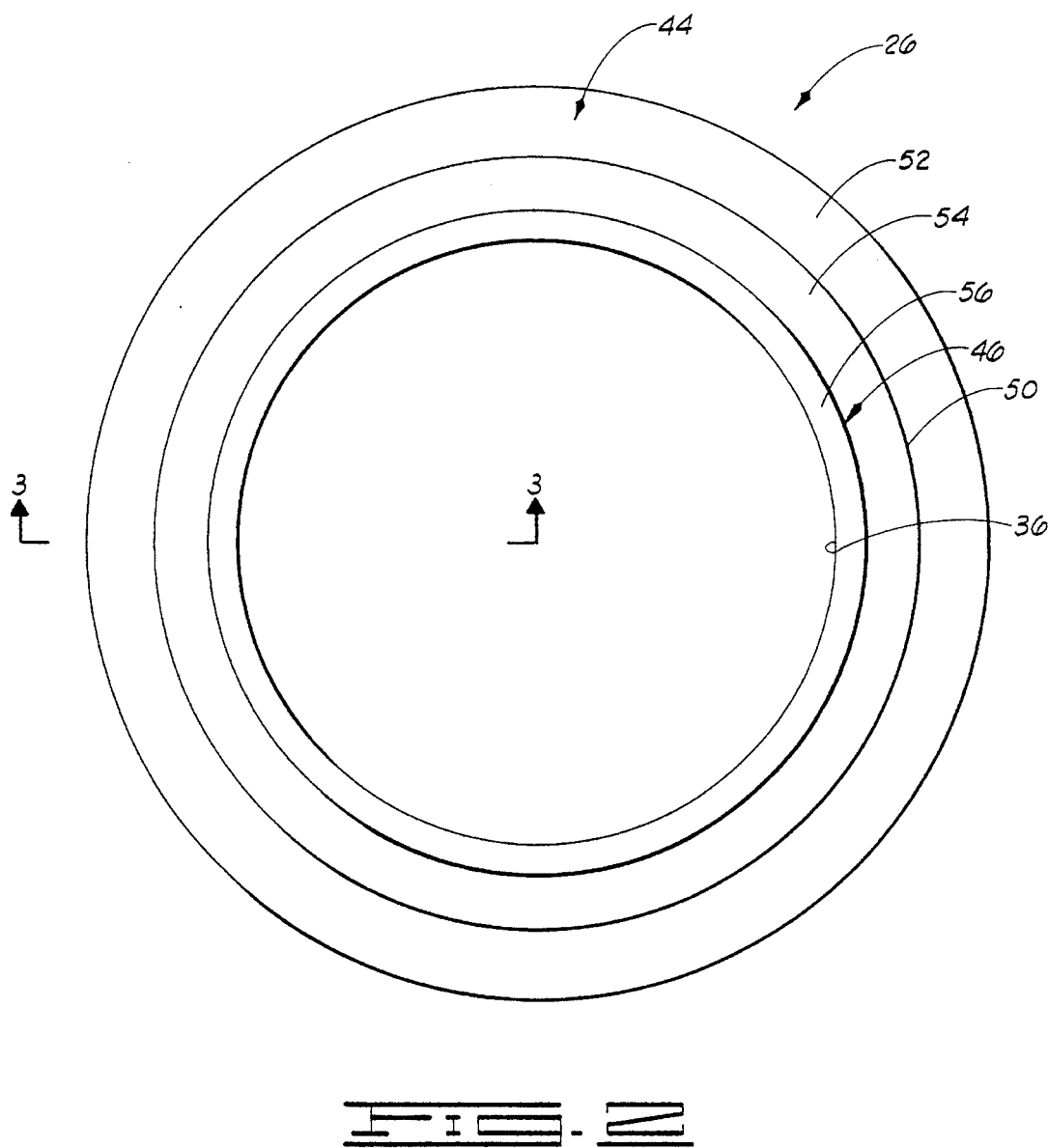
FIG. 2 is a top view on an enlarged scale of the clamp ring of the disc assembly of FIG. 1.
Figure 3:
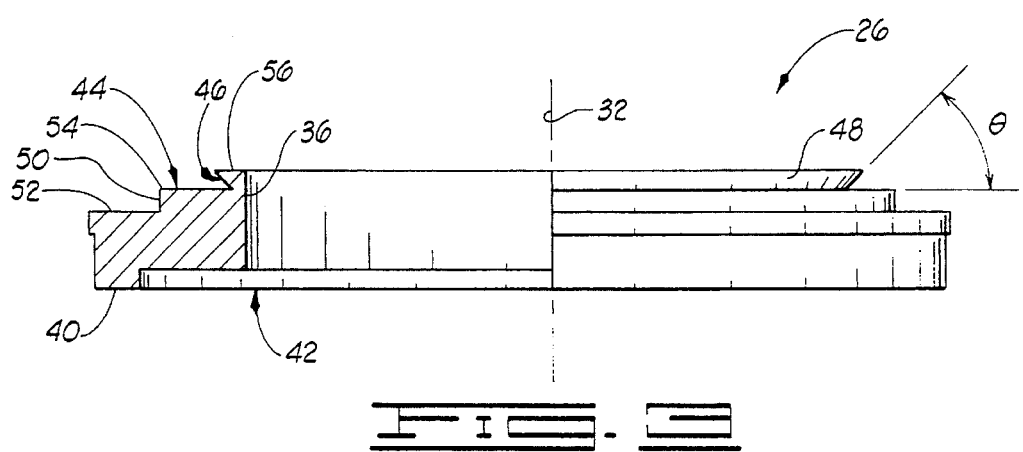
FIG. 3 is an elevational view in partial cross section of the clamp ring shown in FIG. 2.

Referring now to FIGS. 2 and 3, the clamp ring 26 has a bore 36 that is slightly smaller than the diameter of portions of the hub adjacent the end 38 that is opposite the end 17 whereon the flange 13 is formed so that the clamp ring can be secured to the hub 12 by heating the clamp ring 26, slipping it on the end 38 of the hub 12 and permitting the clamp ring 26 to cool in place. Such manner of mounting the clamp ring is well known and is described herein in the spirit of providing a concrete example that will facilitate an understanding of the present invention. A further feature of such example is a boss 40 that is formed on one face 42 of the clamp ring, directed toward the flange 13 of the hub in the assembled disc assembly 10, that engages the washer 24. Like the heat shrink mounting method, the boss 40 and its use in assembling the disc assembly are illustrated to provide a concrete example of the present invention but do not limit the invention.

A feature of the clamp ring that is a part of the present invention is found on the opposite face 44 of the clamp ring 26; specifically, a circular shoulder 46 that is formed in the face 44 and centered on the axis 32, carried into FIG. 3 from FIG. 1, that will be the axis of rotation of the disc assembly 10, including the clamp ring 26, when the disc assembly 10 is assembled. Thus, when the disc assembly is formed into a whole, the shoulder 46 will be disposed in a coaxial relation with the hub 12, the discs 14 and 16, and remaining portions of the clamp assembly of which the clamp ring 26 is a part. An enhancement of the invention with respect to the shoulder 46 that will be discussed below is that the shoulder 46 is undercut to form a surface 48 that conforms to a conical surface that opens away from the face 44 whereon the shoulder is formed as indicated by the cone angle θ at the right hand side of FIG. 3. For a purpose also to be discussed below, a second shoulder 50 is formed on the face 44 so that the face 44 rises from the outside periphery of the clamp ring 26 in a series of steps that have been indicated at 52, 54 and 56 in FIGS. 2 and 3. As will be clear to those of skill in the art, the step structure of the face 44, as well as the undercutting of the shoulder 46, can be readily and inexpensively effected using standard machining techniques.

Figure 4:
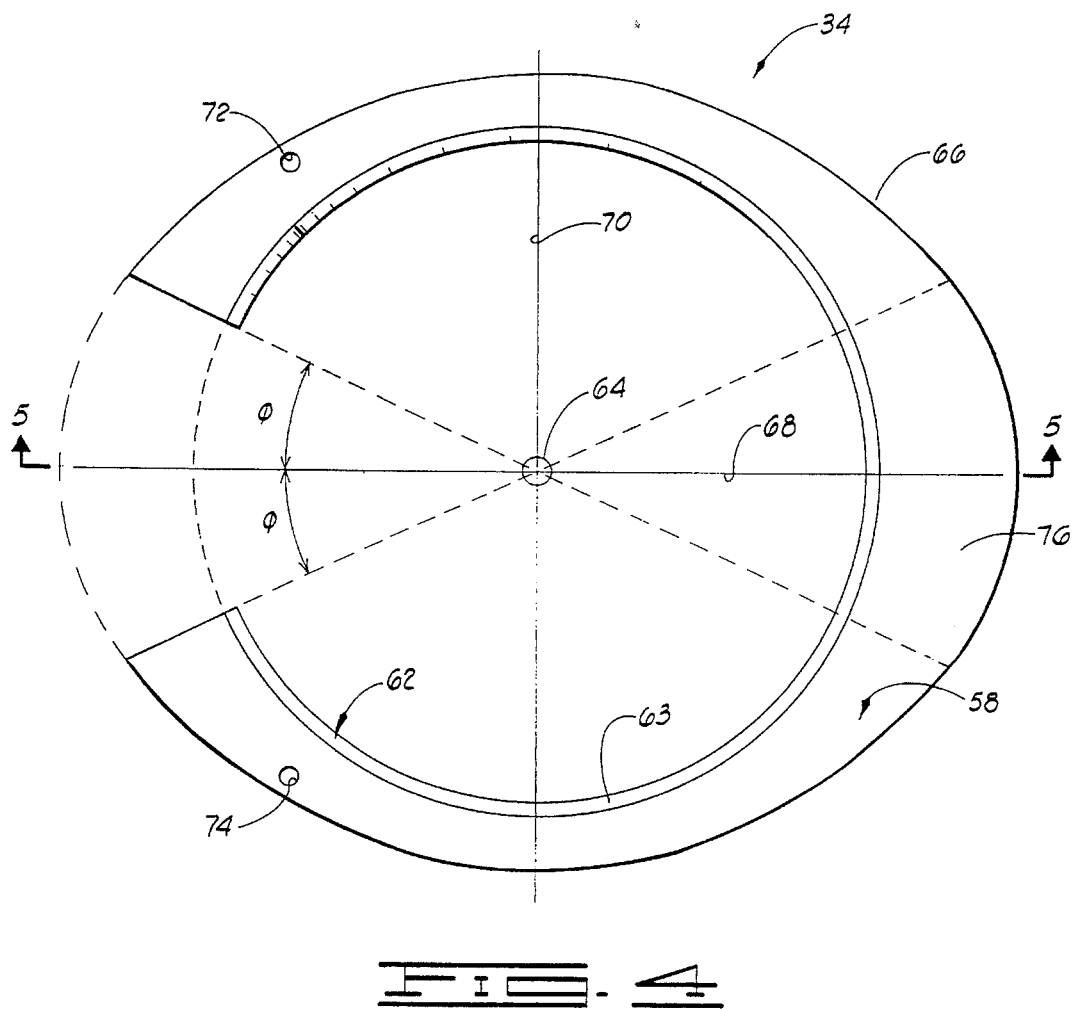
FIG. 4 is a top view on an enlarged scale of the balancing clip of the disc assembly of FIG. 1.
Figure 5:
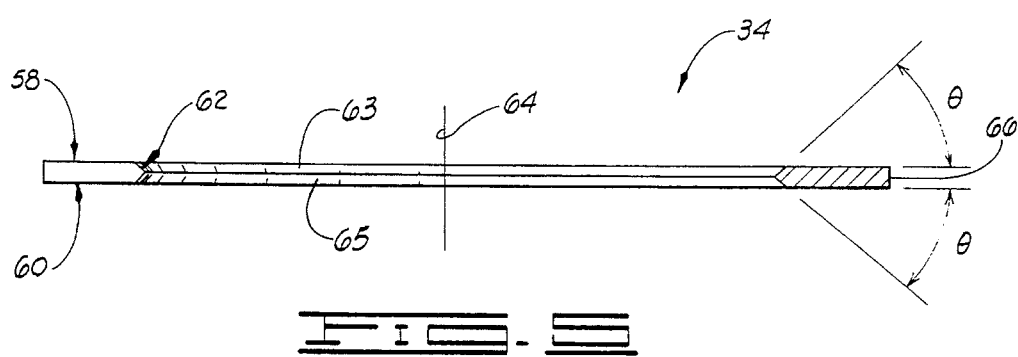
FIG. 5 is a cross section of the clamp ring along line 5—5 of FIG. 4.

In the practice of the present invention, the disc assembly is further comprised of the balancing clip 34 whose structure has been particularly shown in FIGS. 4 and 5 to which attention is now invited. In furtherance of the axial length constraints desired for the disc assembly 10, the balancing clip 34 has a lamellar structure, defined by sides 58 and 60, that can be provided by stamping the clip from sheet metal such as type 301 stainless steel. Further, as shown, the clip 34 is stamped in the general form a letter C having a circularly arcuate inner periphery 62, centered on an axis 64 that extends perpendicularly to the sides 58 and 60 and will coincide with the axis of rotation 32 of the disc assembly when the disc assembly is assembled. (The center of the inner periphery 62 of the clip 34 is indicated by the circle designated 64 in FIG. 4.)

The inner periphery 62 of the clip 34 is formed on a diameter that is slightly smaller than the shoulder 46 on the clamp ring 26 so that the inner periphery 62 of the clip 34 will mate with the shoulder 46 in an expanded state of the clip 34 that will cause the clip 34 to grip the shoulder 46. Moreover, as is particularly shown in FIG. 5, portions 63 and 65 of the inner periphery 62, adjacent the sides 58 and 60 respectively, are chamfered to conform to portions of cones opening toward the sides 58, 60 to which the portions 63 and 65 are adjacent at the cone angle θ of the shoulder 46 to enable mating of the inner edge 62 and the shoulder 46. While, only one chamfer need be provided for the inner periphery of the balancing clip 34, two are preferred in order that the clip 34 can be placed on the shoulder 46 with either side 58, 60 of the clip in engagement with the face 44. Such chamfering is readily effected utilizing a conventional coining or deburring operation.

As indicated in FIG. 4, the outer periphery 66 of the clip 34 is cut to conform to an ellipse having a major axis indicated at 68 and minor axis indicated at 70 in FIG. 4. The C shape of the clip 34 is then achieved by removing portions of the clip 34 that are positioned symmetrically with respect to the major axis 68, indicated by the angles φ in FIG. 4, so that the clip will be bilaterally symmetric with respect to the major axis 68. As noted above, an aspect of the present invention is that the gap between the ends of the C can be selected to exhibit a range of values for different clips 34 to permit balancing of disc assemblies 10 that, without the clip, exhibit different departures of the center of mass of the assembly 10 from the rotation axis 32. Such selection is effected through the adjustment of the angle φ in FIG. 4.

The final feature of the balancing clip 34 is a pair of holes 72 and 74 formed on the same side of the minor axis 70 that the gap between the ends of the C is formed. The purpose of these holes will become clear below.

Assembly of the Disc Assembly

Figure 6:
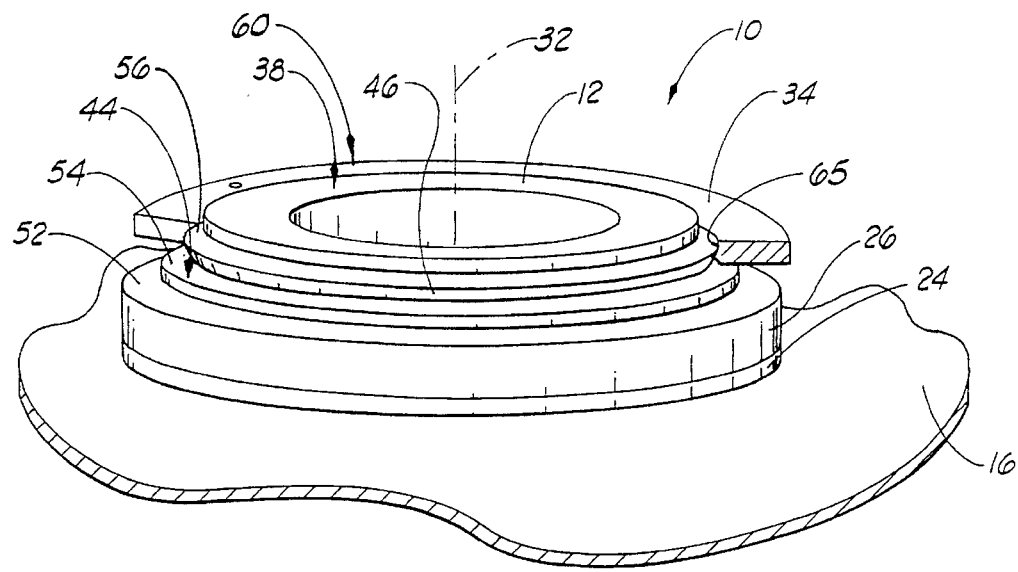
FIG. 6 is a fragmentary isometric view of portions of the assembled disc assembly of FIG. 1 near one end of the hub whereon the clamp ring and balancing clip are mounted.

FIG. 6, which illustrates portions of the assembled disc assembly 10, has been included to provide a basis for discussing the manner in which the disc assembly 10 is assembled.

In one preferred construction of a disc assembly 10, the apertures 15 of the discs are formed on a diameter that exceeds the diameter of the hub 12 but is smaller than the diameter of the flange 13 on the end 17 of the hub 12. Similarly, the spacers between the discs and the washer 24 have inside diameters that exceed the diameter of the hub 12. Consequently, the discs, spacers and washer can be placed on the hub 12 from the end 38 as has been shown for the washer 24 and a fragment of the disc 16 in FIG. 6. Often, the hub, the discs, the spacers and the washers will be dimensioned to leave a narrow circular gap between the outer periphery of the hub and the inner peripheries of the discs 14, 16, spacers 22 and the washer 24 to compensate for thermal expansion of the disc assembly 10 during operation of the disc drive of which the assembly 10 is a part and special tools are used to position the discs, the spacers and washers on the hub to attain as close a coaxial relationship between the discs, spacers, washer and hub as is practicable as a prelude to assembly of the disc assembly 10. The positioning of the discs, spacers and the washer in this manner is conventional and need not be further discussed for purposes of the present disclosure. Similarly, other positioning techniques that will place the center of mass of the assembly 10 substantially on the axis of the hub 12 are known and the present invention contemplates that such techniques can be employed where the present invention is used to balance the disc assembly 10.

In the preferred construction of the disc assembly 10 that has been described above, the clamp ring 26 is then heated to expand the clamp ring sufficiently to fit over the end 38 of the hub 12 and the boss 40 on the clamp ring 26 is forced against the washer 24 to clamp the discs, 14, 16, spacers 22, and washer 24 in position. The clamp ring 26 is then permitted to cool while the clamping force is maintained to secure the clamp ring 26 about the end 38 of the hub 12.

The assembly of the disc assembly 10 to the point that has been described above is conventional and will result in the axis of rotation 32, carried into FIG. 6 from FIG. 1, being substantially a symmetry axis for the disc assembly 10. The balancing clip is then utilized to effect final balancing of the disc assembly 10 as will now be described.

Balancing of the disc assembly 10 begins, as in conventional balancing techniques, with a measurement of the imbalance. Such measurement is carried out by scribing an index mark on the end 38 of the hub 12 and spinning the hub up to a suitable rotational speed while supporting the disc assembly 10 with force transducers. By using the index mark as a trigger to measure the forces necessary to hold the disc assembly in position as a function of orientation of the disc assembly 10, both the extent and direction of the displacement of the center of mass of the disc assembly 10 from the rotation axis 32 can be measured.

Once the imbalance of the disc assembly 10 has been measured, a balancing clip 34 is selected to effect the final balance of the assembly 10. It will be noted that the balancing clip 34 can be treated as a symmetric object in combination with a small weight, represented by the segment of the clip indicated at 76 in FIG. 4, so that the effect on the balance of the disc assembly 10 of clips having differing angles φ in FIG. 4 can be precalculated in a conventional manner. Similarly, the location of the segment to effect proper dynamic balance of the disc assembly 10 can be precalculated. Once the selection has been made, the selected clip 34 is spread using pins inserted through the holes 72 and 74 and placed on the shoulder 46 with the orientation that will achieve balance of the disc assembly 10. Relief for the pins to permit mounting of the clip 34 is provided by the formation of the second shoulder 50 that has been described above. Once the clip is located about the shoulder 46, the pins are drawn together to release the clip 34 and withdrawn from the holes 72 and 74. As the balancing clip 34 relaxes, the mating of one of the chamfered portions 63, 65 (65 as shown in FIG. 6) of the inner periphery 62 of the clip 34 with the angled shoulder 46 forces the clip tightly against the face 44 on the clamp ring 26 to maintain optimal flatness of the clip 34 that will contribute to minimization of the axial length of the disc assembly 10.

As has been noted above, the invention is well suited for machine implementation of final balancing of the disc assembly 10. To this end, the balancing can be effected by mounting the balancing clip 34, with the arms of the C spread, on a rotating head (not shown) upon which an optical detector is mounted for detecting the mark scribed on the end 38 of the hub 12 for determining the imbalance of the disc assembly 10, rotating the head to detect the scribed mark, and then rotating the head through whatever further angle is necessary to properly orient the balancing clip 34 with the shoulder 46 on the clamp ring 26. The clip 34 can then be lowered to the face 44 to extend about the shoulder 46 and released as described above.

Description of the Second Embodiment

As has been described above, in the preferred embodiment of the invention, the face 44 on which the shoulder 46 that receives the balancing clip 34 is formed is located on the end of the clamp ring 26 that is faced away from the flange 13 on the hub 12 when the disc assembly 10 is assembled. An advantage of forming the shoulder 46 on the clamp ring 26 is that mounting the clip 34 on the clamp ring 26 facilitates minimization of the axial height of the disc assembly 10. Further, mounting the clip 34 on the clamp ring 26 maximizes the displacement of the gap between the ends of the arms of the clip 34 to extend the maximum imbalance that can be corrected for a selected clip thickness.

Figure 7:
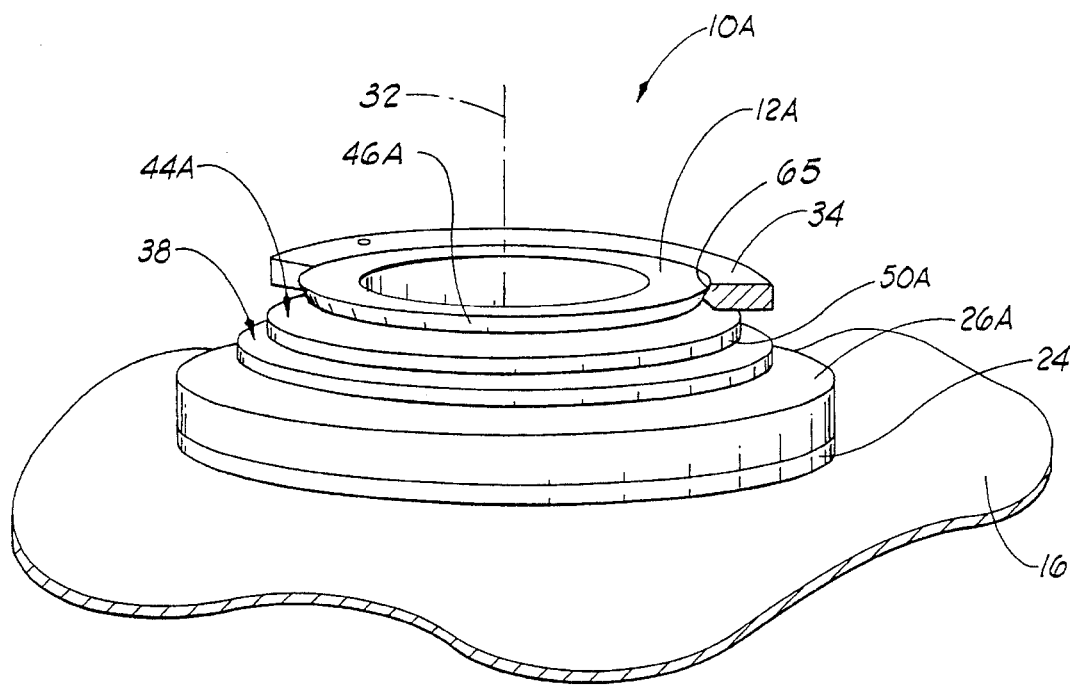
FIG. 7 is a fragmentary isometric view, similar to FIG. 6, of a second embodiment of a disc drive disc assembly constructed in accordance with the present invention.

However, such location of the shoulder 46 is often not critical to the practice of the invention. More particularly, as shown in FIG. 7, the shoulders 46 and 50 can be deleted from the clamp ring, designated 26A in FIG. 7, and shoulders 46A and 50A, corresponding to the shoulders 46 and 50 on the clamp ring 26, can be formed on the face 44A provided by the end 38 of the hub which has been designated 12A in FIG. 7. The balancing clip 34 can then be mounted directly on the end 38 of the hub 12A.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc assembly for a disc drive, the disc assembly comprising a plurality of circular discs, each having a central circular aperture formed axially therethrough, a cylindrical hub rotatably mounted on a case of the disc drive, wherein the hub is extended axially through the apertures of the discs for mounting the discs on the hub, and cylindrically symmetric clamping means, including a clamp ring secured to one end of the hub, for clamping the discs on the hub in a substantially coaxial relation with the hub, the improvement wherein the disc assembly further comprises a lamellar, C-shaped balancing clip mounted on one of the hub or the clamp ring to extend in an arc about the axis of the hub, wherein a circular shoulder is formed coaxially with the hub on a face formed perpendicularly to the hub axis on one of the clamp ring or said one end of the hub, wherein the balancing clip is further characterized as having a circularly arcuate inner periphery to mate with at least portions of said shoulder, wherein the balancing clip is mounted on said shoulder, and wherein the shoulder is undercut to conform to a conical surface opening away from the face whereon the shoulder is formed and wherein portions of the inner periphery of the balancing clip adjacent at least one side thereof are chamfered to conform to a conical surface opening toward said one side of the clip at the cone angle of the shoulder.

2. The disc assembly of claim 1 wherein the balancing clip is further characterized as having an elliptically arcuate outer periphery centered on the center of the inner periphery of the balancing clip and bilaterally symmetric with respect to the major axis of the ellipse to which the outer periphery of the balancing clip conforms.

3. In a disc assembly for a disc drive, the disc assembly comprising a plurality of circular discs, each having a central circular aperture formed axially therethrough, a cylindrical hub rotatably mounted on a case of the disc drive, wherein the hub is extended axially through the apertures of the discs for mounting the discs on the hub, and cylindrically symmetric clamping means, including a clamp ring secured to one end of the hub, for clamping the discs on the hub in a substantially coaxial relation with the hub, the improvement wherein the disc assembly further comprises a lamellar, C-shaped balancing clip mounted on one of the hub or the clamp ring to extend in an arc about the axis of the hub, wherein a circular shoulder is formed coaxially with the hub on a face formed perpendicularly to the hub axis on one of the clamp ring or said one end of the hub, wherein the balancing clip is further characterized as having a circularly arcuate inner periphery to mate with at least portions of said shoulder, wherein the balancing clip is mounted on said shoulder, and wherein the shoulder is undercut to conform to a conical surface opening away from the face whereon the shoulder is formed and wherein a portion of the inner periphery of the balancing clip adjacent each side thereof is chamfered to conform to a conical surface opening toward the side of the clip to which the portion of the inner periphery is adjacent at the cone angle of the shoulder.

4. The disc assembly of claim 3 wherein the balancing clip is further characterized as having an elliptically arcuate outer periphery centered on the center of the inner periphery of the balancing clip and bilaterally symmetric with respect to the major axis of the ellipse to which the outer periphery of the balancing clip conforms.

5. In a disc assembly for a disc drive, the disc assembly comprising a plurality of circular discs, each having a central circular aperture formed axially therethrough, a cylindrical hub rotatably mounted on a case of the disc drive, wherein the hub is extended axially through the apertures of the discs for mounting the discs on the hub, and cylindrically symmetric clamping means, including a clamp ring secured to one end of the hub, for clamping the discs on the hub in a substantially coaxial relation with the hub, the improvement wherein the disc assembly further comprises a lamellar, C-shaped balancing clip mounted on one of the hub or the clamp ring to extend in an arc about the axis of the hub, wherein a circular shoulder is formed coaxially with the hub on a face formed perpendicularly to the hub axis on one of the clamp ring or said one end of the hub, wherein the balancing clip is further characterized as having a circularly arcuate inner periphery to mate with at least portions of said shoulder, wherein the balancing clip is mounted on said shoulder, and wherein the balancing clip is further characterized as having an elliptically arcuate outer periphery centered on the center of the inner periphery of the balancing clip and bilaterally symmetric with respect to the major axis of the ellipse to which the outer periphery of the balancing clip conforms.

* * * * *